(12) United States Patent
Agrawal et al.

(10) Patent No.: US 12,537,896 B2
(45) Date of Patent: Jan. 27, 2026

(54) EXTENDABLE DISPLAY DEVICE THAT ASSOCIATES EDGE FORCE INPUTS WITH A CONTROL ACTION

(71) Applicant: MOTOROLA MOBILITY LLC, Wilmington, DE (US)

(72) Inventors: Amit Kumar Agrawal, Bangalore (IN); Amal Chandran, Bengaluru (IN); Thomas Yates Merrell, St Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 314 days.

(21) Appl. No.: 18/476,032

(22) Filed: Sep. 27, 2023

(65) Prior Publication Data

US 2025/0106318 A1    Mar. 27, 2025

(51) Int. Cl.
   *H04M 1/72469* (2021.01)
   *G06F 3/0362* (2013.01)
   *G06F 3/0487* (2013.01)
   *H04M 1/02* (2006.01)

(52) U.S. Cl.
   CPC ...... *H04M 1/72469* (2021.01); *G06F 3/0362* (2013.01); *G06F 3/0487* (2013.01); *H04M 1/0268* (2013.01)

(58) Field of Classification Search
   CPC ........... H04M 1/72469; H04M 1/0268; H04M 1/0239; H04M 1/0235; G06F 3/0362; G06F 3/0487
   See application file for complete search history.

(56) References Cited

U.S. PATENT DOCUMENTS

| 2019/0261519 | A1* | 8/2019 | Park | H04M 1/0235 |
| 2019/0346954 | A1* | 11/2019 | Jung | G06F 3/0416 |
| 2021/0034210 | A1* | 2/2021 | Chung | G06F 3/0488 |
| 2022/0148464 | A1* | 5/2022 | Kwak | G06F 1/1643 |
| 2024/0411445 | A1* | 12/2024 | Kang | H04M 1/0235 |

* cited by examiner

*Primary Examiner* — Angelica Perez
(74) *Attorney, Agent, or Firm* — Isidore PLLC

(57) ABSTRACT

An electronic device, method and computer program product enable additional touch function for rollable or scrollable display device. The electronic device presents a function on a flexible display coupled across at least a front of a flexible display support structure and a base housing. The function has interactive feature(s) that can be manually modified by a user input. The electronic device segments non-display portion(s) of at least a distal edge of a flexible display support structure that is extendable and retractable relative to a base housing that may be held. The segments emulate hardware buttons at edge touch location(s) corresponding to the interactive feature(s). A control input of the interactive feature(s) detected by touch sensor(s) is associated to a touch at a particular edge touch location. The electronic device triggers a corresponding response of the presented function in response to receipt of the control input.

20 Claims, 10 Drawing Sheets

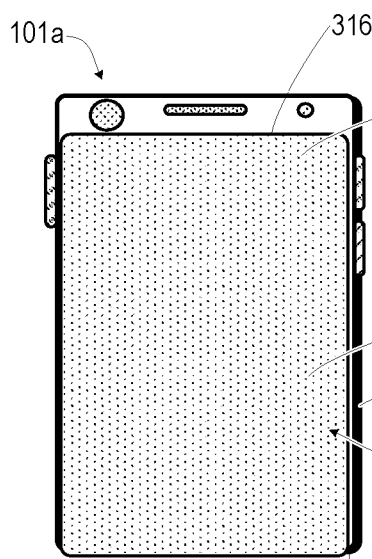
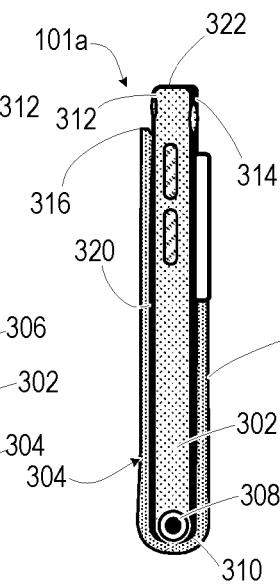
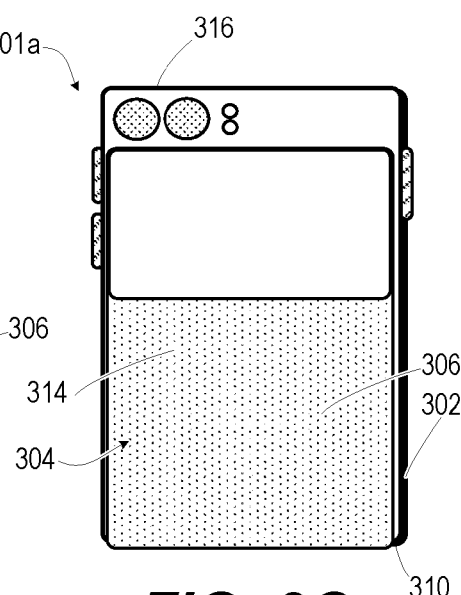
FIG. 3A    FIG. 3B    FIG. 3C
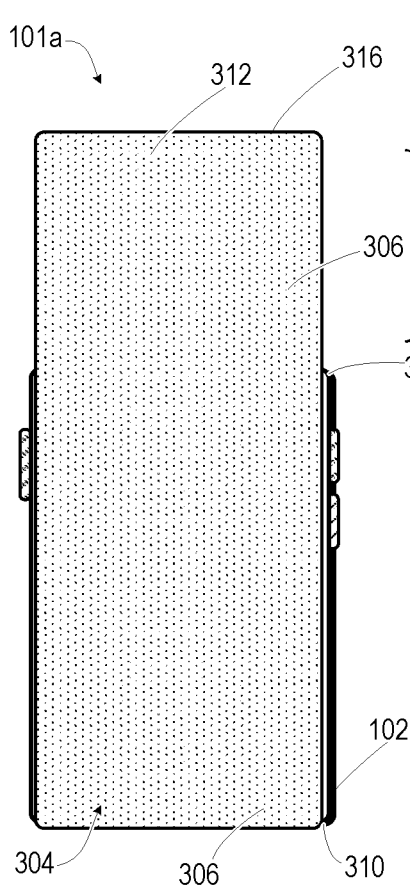
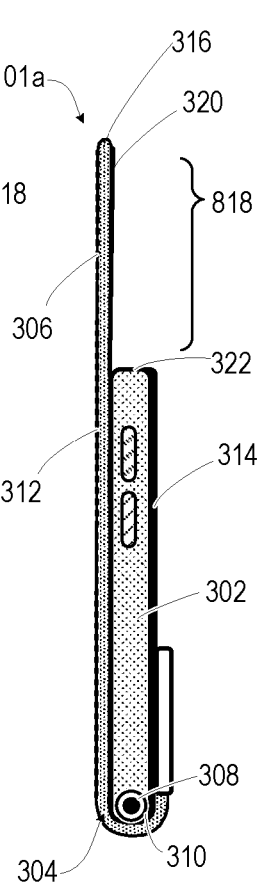
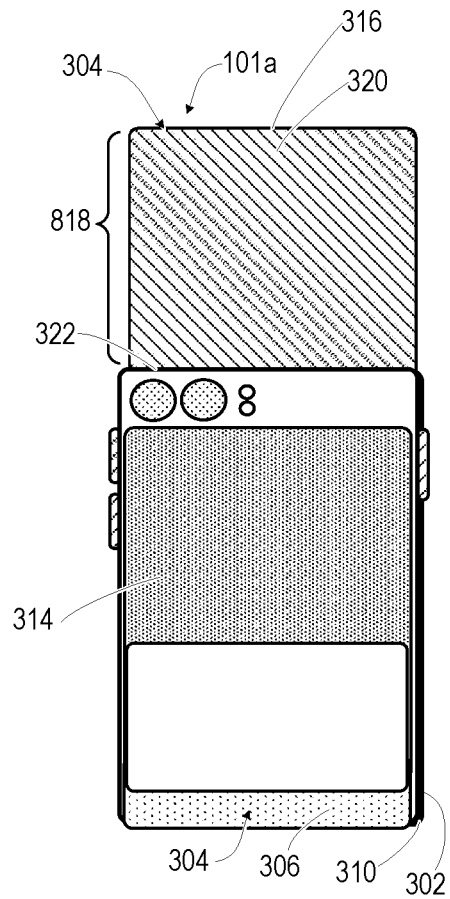
FIG. 3D    FIG. 3E    FIG. 3F

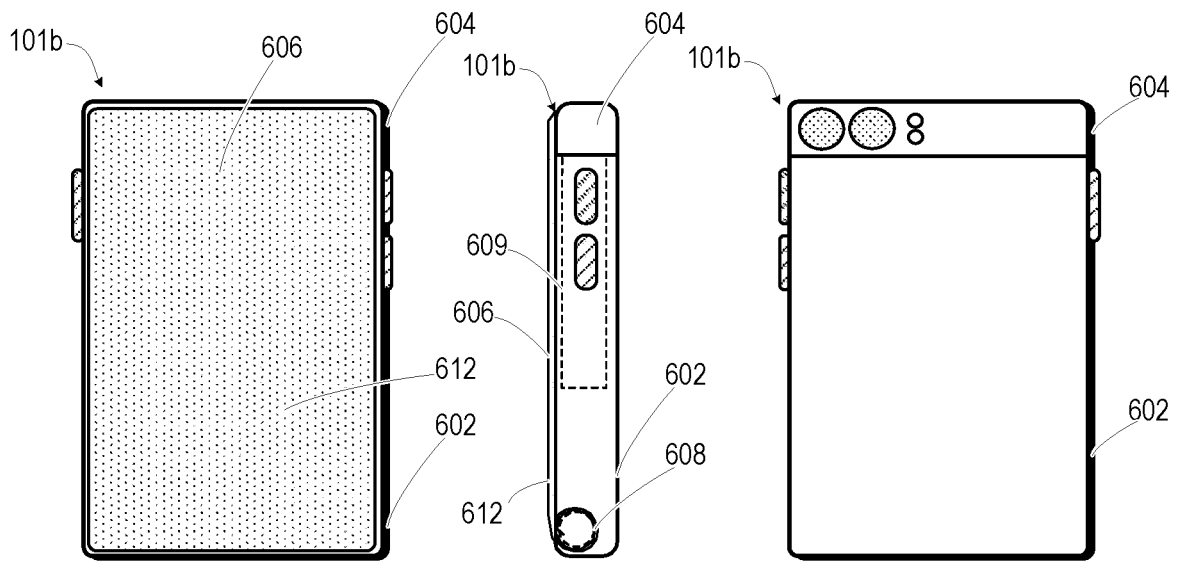
*FIG. 6A*    *FIG. 6B*    *FIG. 6C*
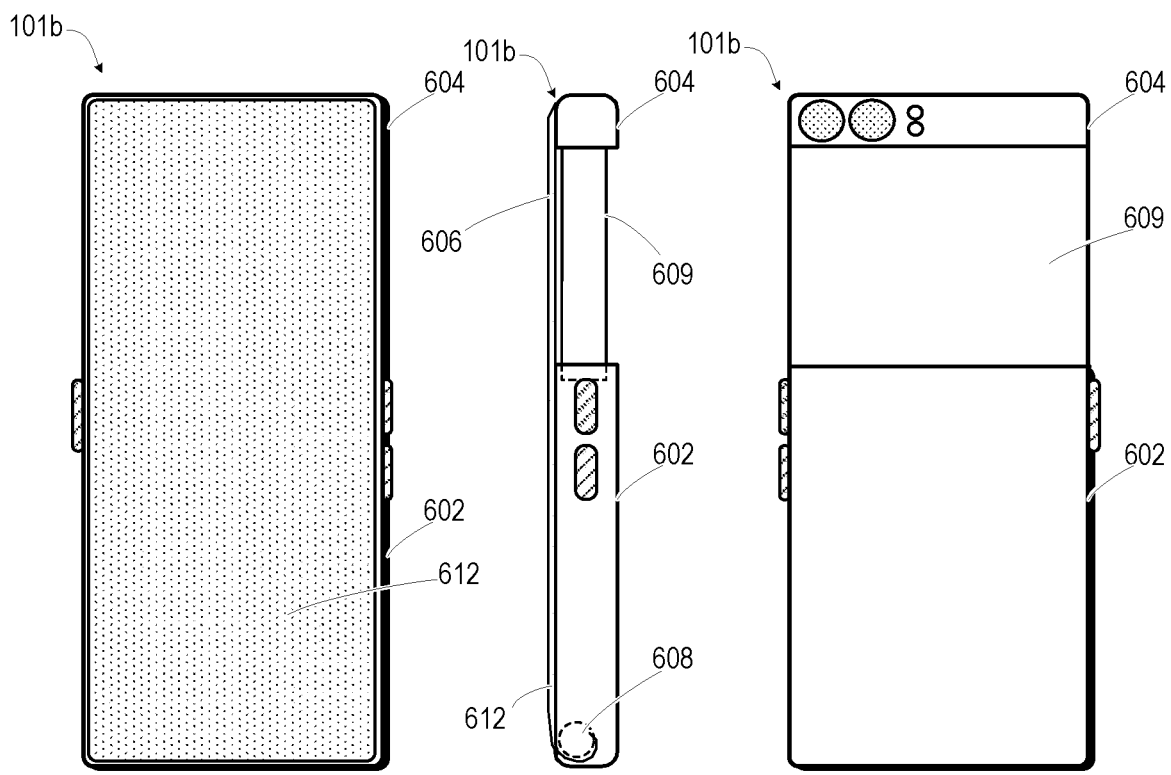
*FIG. 6D*    *FIG. 6E*    *FIG. 6F*

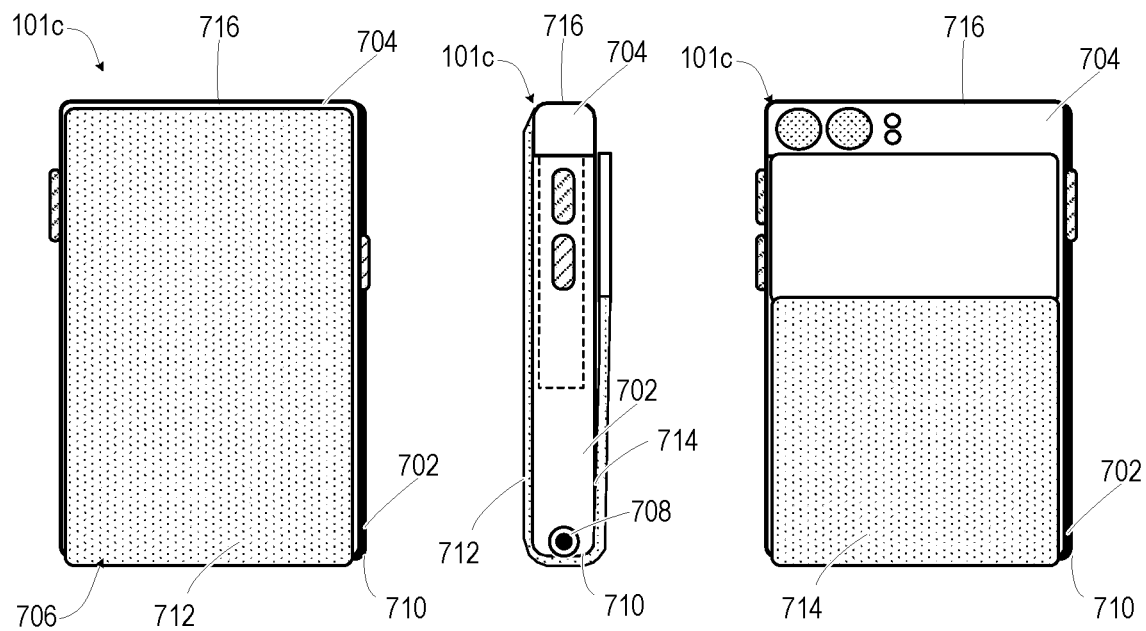
FIG. 7A  FIG. 7B  FIG. 7C
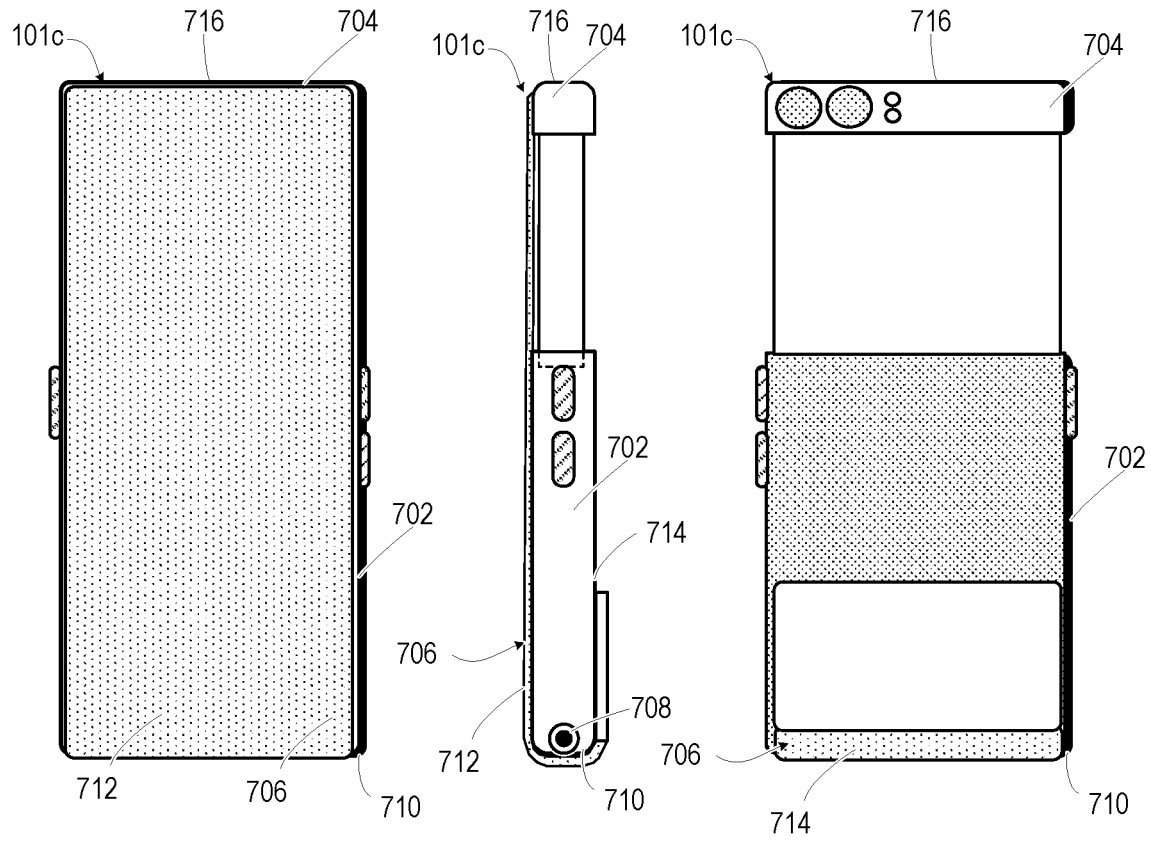
FIG. 7D  FIG. 7E  FIG. 7F

EXTENDABLE DISPLAY DEVICE THAT ASSOCIATES EDGE FORCE INPUTS WITH A CONTROL ACTION

BACKGROUND

1. Technical Field

The present disclosure relates generally to hand-held electronic devices, and more particularly to hand-held electronic devices having an extendable display.

2. Description of the Related Art

Portable electronic communication devices, particularly smartphones, have become ubiquitous. People all over the world use such devices to stay connected. These devices have been designed in various mechanical configurations. Conventionally, these communication devices each have a rigid display disposed along a major face of the communication device. One recent configuration of handheld portable electronic devices incorporates rollable or scrollable flexible displays, where the displays extend or retract via a telescoping housing or via a sliding blade that either rolls the flexible display onto a back of the device housing or extends the flexible display from a front side of the device housing. A user of the electronic device holds a base housing while the extendable portion extends or retracts.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A is a front view of a first example communication device having a flexible display support structure implemented as a blade assembly that is in a retracted position, according to one or more embodiments;

FIG. 3B is a left side view of the first example communication device of FIG. 3A having the blade assembly in the retracted position, according to one or more embodiments;

FIG. 3C is a back view of the first example communication device of FIG. 3A having the blade assembly in the retracted position, according to one or more embodiments;

FIG. 3D is a front view of the first example communication device of FIG. 3A with the blade assembly in an extended position, according to one or more embodiments;

FIG. 3E is a left side view of the first example communication device of FIG. 3A having the blade assembly in the extended position, according to one or more embodiments;

FIG. 3F is a back view of the first example communication device of FIG. 3A having the blade assembly in the extended position, according to one or more embodiments;

FIG. 6A is a front view of a second example communication device having a flexible display support structure implemented as a telescoping housing that is in a retracted position supporting a flexible display having a remaining portion that scrolls, according to one or more embodiments;

FIG. 6B is a left side view of the second example communication device of FIG. 6A having the telescoping housing in the retracted position, according to one or more embodiments;

FIG. 6C is a back view of the second example communication device of FIG. 6A having the telescoping housing in the retracted position, according to one or more embodiments;

FIG. 6D is a front view of the second example communication device of FIG. 6A with the telescoping housing in an extended position, according to one or more embodiments;

FIG. 6E is a left side view of the second example communication device of FIG. 6A having the telescoping housing in the extended position, according to one or more embodiments;

FIG. 6F is a back view of the second example communication device of FIG. 6A having the telescoping housing in the extended position, according to one or more embodiments;

FIG. 7A is a front view of a third example communication device having a flexible display support structure implemented as a telescoping housing that is in a retracted position supporting a flexible display having a remaining portion that rolls onto a back of a base housing, according to one or more embodiments;

FIG. 7B is a left side view of the third example communication device of FIG. 7A having the telescoping housing in the retracted position, according to one or more embodiments;

FIG. 7C is a back view of the third example communication device of FIG. 7A having the telescoping housing in the retracted position, according to one or more embodiments;

FIG. 7D is a front view of the third example communication device of FIG. 7A with the telescoping housing in an extended position, according to one or more embodiments;

FIG. 7E is a left side view of the third example communication device of FIG. 7A having the telescoping housing in the extended position, according to one or more embodiments;

FIG. 7F is a back view of the third example communication device of FIG. 7A having the telescoping housing in the extended position, according to one or more embodiments;

DETAILED DESCRIPTION

Figure 1:
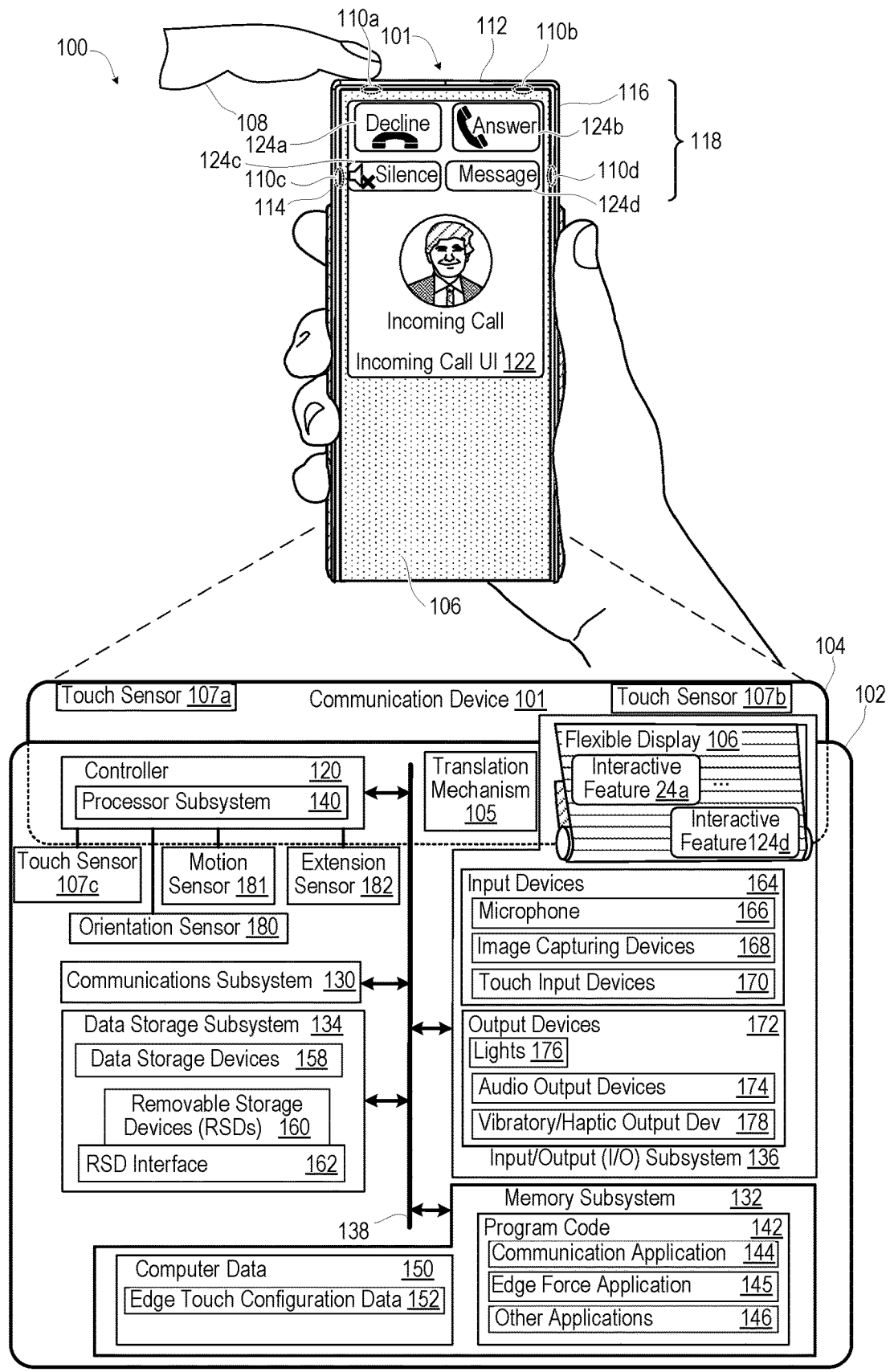
FIG. 1 presents a simplified functional block diagram and front view of a communication device that includes an extendable display configured for edge touch control functionality, according to one or more embodiments.

According to aspects of the present disclosure, an electronic device, a method, and a computer program product enable a scrollable or rollable display device to be configured to support edge touch control functionality by monitoring for a force on one of multiple edge portions of an extended portion of the scrollable or rollable display device while a base portion is being held. In one or more embodiments, the electronic device includes a base housing having a front side and a back side. The electronic device includes a flexible display support structure having an extended portion with a distal edge extending between ends of two orthogonal longitudinal edges. The flexible display support structure is moveably attached to and positionable on the base housing between a retracted position and an extended position relative to the base housing. A flexible display is coupled to the flexible display support structure across a front side of the base housing. A larger portion of the flexible display is presented while the flexible display support structure is in the extended position, while a smaller portion of the flexible display is presented while the flexible display support structure is in the retracted position. The electronic device includes more than one touch sensors spaced apart on one or more of the base housing and the flexible display support structure. The more than one touch sensors are configured to detect a force applied to one edge touch location among a plurality of edge touch locations defined along the distal edge and the two orthogonal longitudinal edges of the extended portion of the flexible display support structure. The force can be applied while the base housing is being held. A controller of the electronic device is communicatively connected to the flexible display support structure, and the more than one touch sensor. The controller presents a function on the electronic device having at least one interactive feature that can be manually modified by a user input. The controller segments one or more non-display portions of at least the distal edge of the flexible display support structure into one or more edge touch location, which emulate hardware input buttons and present a corresponding input to the at least one interactive feature. The controller associates a control input of the at least one interactive feature to a touch provided at a particular one of the more than one edge touch locations. The touch is detectable by the more than one touch sensor. The controller detects the touch applied to the particular one of the edge touch locations. The controller triggers a corresponding response of the presented interactive feature on receipt of the touch control input.

In one or more embodiments, the electronic device associates device actions as a factor of degree of force applied on different corners or edges of an extendable display of the electronic device. The electronic device may enable edge touch functionality by determining that the electronic device is capable of expanding or contracting or moving the display (e.g., a scrollable, rollable, or a slidable display device). The electronic device determines, based on monitoring an accelerometer, gyroscope and similar sensing mechanisms, that a current position of the extendable display is at least partially extended. The electronic device logically divides the edge portion(s) of the extendable display into two or more portions individually distinguishable or detectable with an application of force applied with human hands. The number of portions may depend on the size of the edge. The electronic device detects the degree and direction of the force applied to one of the divided portions in the extended display. The direction of the force may be aligned with the direction of extension and retraction of the extendable display. Alternatively, or in addition, the force may be applied to the sides of the extended portion of the display, orthogonal to the direction of extension and retraction of the extendable display. The electronic device activates a user interaction trigger based on detection of such force applied at one of the edge portions corresponding to the logical divisions. A visual cue on the extendable display may indicate the action that may be triggered. An animation of a gesture may be presented to prompt the correct user input. In another embodiment, gestures (e.g., a slider control input) may be based on the gradual application of force along the side or edge of the device as a swiping or moving touch. The present disclosures creates an emulation of two or more hardware buttons using the edges of the extendable display of a rollable device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized.

Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic device having an extendable design form, in which the features of the present disclosure are advantageously implemented for providing edge touch control functionality. In one or more embodiments, the electronic device includes additional communications functionality as communication device 101 to operate as a mobile user device in communication environment 100. Communication device 101 can be one of a host of different types of devices, including but not limited to, a mobile cellular phone, satellite phone, or smart phone, a laptop, a netbook, an ultrabook, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices.

Communication device 101 includes base housing 102 having a front side and a back side. Flexible display support structure 104 is moveably attached to and positionable on base housing 102 between a retracted position and an extended position relative to base housing 102. In one or more embodiments, translation mechanism 105 moves flexible display support structure 104 relative to base housing 102. Translation mechanism 105 can position flexible display support structure 104 at any one of multiple positions between a fully retracted position, at least one intermediate position, and a fully extended position. The actual number of intermediate positions is a design feature and can be different for each device and can also be programmable. e.g., by a device user. Flexible display 106 is coupled across at least a front face of base housing 102 and flexible display support structure 104. Communication device 101 presents a larger portion of flexible display 106 on while flexible display support structure 104 is in the extended position and a smaller portion of flexible display 106 while flexible display support structure 104 is in the retracted position. Touch sensors 107a, 107b, and 107c are spaced apart on one or more of base housing 102 and flexible display support structure 104. Touch sensors 107a, 107b, and 107c are configured to detect a force applied by user 108 to one edge touch location (110) of more than one (i.e., a plurality of) edge touch locations 110a, 110b, 110c, 110d, 110e, 110f presented along distal edge 112 and the two orthogonal longitudinal edges, depicted as left and right edges 114 and 116 of extended portion 118 of flexible display support structure 104. The force can be applied while base housing 102 is being held by user 108.

Controller 120 is communicatively connected to translation mechanism 105, flexible display 106, and the more than one touch sensors 107a, 107b, and 107c. Controller 120 presents a function, depicted as an incoming call user interface (UI) 122 as an example function, on flexible display 106 of communication device 101. Incoming call UI 122 has at least one interactive feature that can be manually modified by a user input, which can be provided as a force applied at one or more edge touch locations 110 of flexible display support structure 104. In an example, decline interactive feature 124a is presented proximate to first touch location 110a on a left side of distal edge 112. Answer interactive feature 124b is presented proximate to second touch location 110b on a right side of distal edge 112. Silence interactive feature 124c is presented on a left upper position of left edge 114 of extended portion 118. Messaging interactive feature 124d is presented on a right upper position of right edge 116 of extended portion 118. Controller 120 segments one or more non-display portions of at least distal edge 112 of flexible display support structure 104 to emulate hardware buttons at one or more edge touch locations 110a-110d corresponding to at least one interactive feature 124a-124d. Controller 120 monitors touch sensor 107a, 107b, and 107c for a control input by user 108. Controller 120 associates a control input of at least one interactive feature 124a-124d to a touch at a particular one of the more than one edge touch locations 110a-110d. The touch is detectable by the more than one touch sensors 107a-107c. Controller 120 detects the control input applied to the particular one of the edge touch locations 110a-110d. Controller 120 triggers a corresponding response (e.g., accept, reject, etc.) providing a control input to the presented function (e.g., incoming call UI 122).

Figure 2A:
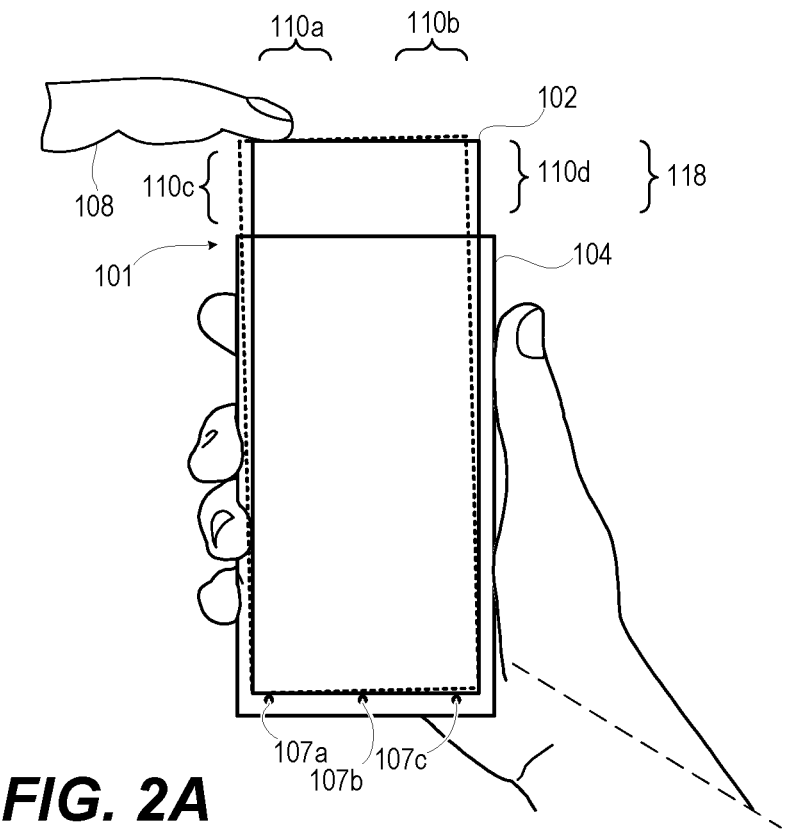
FIG. 2A is a front view of the communication device of FIG. 1 with the extendable display partially extended and annotated with segmented edge touch locations assigned to emulate hardware buttons along a distal edge, according to one or more embodiments.

FIG. 2A is a front view of communication device 101 with the extendable display partially extended with flexible display support structure 104 translating extended portion 118 beyond base housing 102. In an example, based at least in part on a length of extended portion 118, controller 120 segments distal edge 112 into two edge touch locations 110a-110d. Depending on placement and capabilities of touch sensor 107a-107c, distal edge 112 can be segmented into more edge touch locations. Touch locations 110a-110d are assigned to emulate hardware buttons along distal edge 112, left edge 114, and right edge 116. User 108 is touching edge touch location 110a, which results in a small applied force that can deflect flexible display support structure 104. The force is transferred through flexible display support structure 104 to a mechanical coupling with base housing 102, which causes different force measurements by each touch sensor 107a-107c. Controller 120 determines the location at which the touch input occurred based on the different force measurements.

Figure 2B:
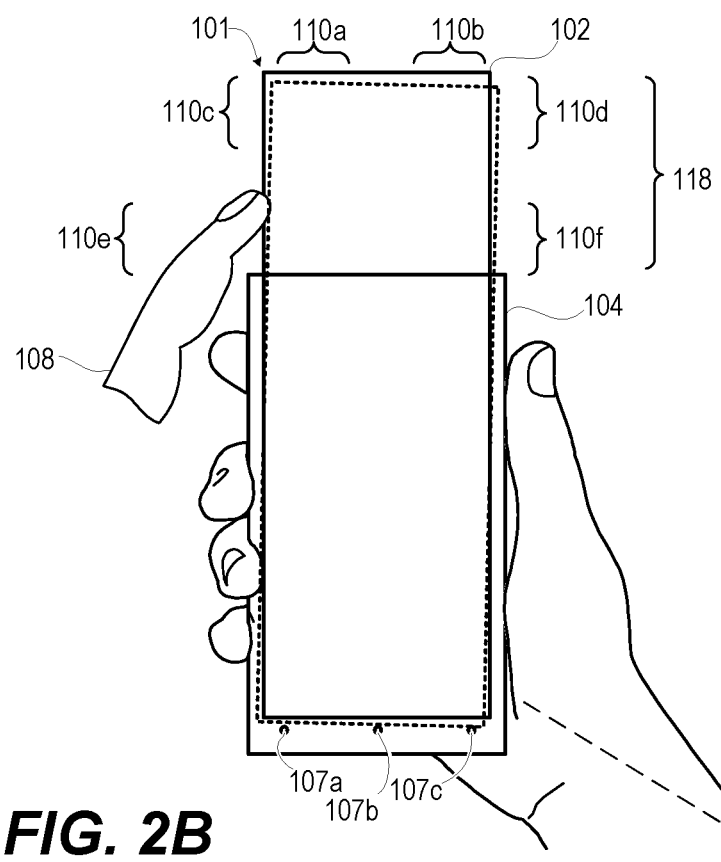
FIG. 2B is a front view of the communication device of FIG. 1 with the extendable display fully extended and annotated with segmented edge touch locations assigned to emulate hardware buttons along a distal edge, according to one or more embodiments.

FIG. 2B is a front view of communication device 101 with the extendable display fully extended, with flexible display support structure 104 translating extended portion 118 beyond base housing 102. In an example, based at least in part on a greater length of extended portion 118, controller 120 further segments left and right edges 114 and 116 respectively with lower left and right edge touch locations 110e-110f. User 108 is touching edge touch location 110e, which results in a small applied force that can deflect flexible display support structure 104. The force is transferred through flexible display support structure 104 to a mechanical coupling with base housing 102, which causes different force measurements by each touch sensor 107a-107c. Controller 120 determines the location the touch input occurred based on the different force measurements.

With continued reference to FIG. 1, communication device 101 may include communications subsystem 130, memory subsystem 132, data storage subsystem 134 and input/output (I/O) subsystem 136, each managed by controller 120. To enable management by controller 120, system interlink 138 communicatively connects controller 120 with communications subsystem 130, memory subsystem 132, data storage subsystem 134 and I/O subsystem 136. System interlink 138 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 138) are illustrated in FIG. 1, it is to be understood that more, fewer, or different interconnections may be present in other embodiments.

Controller 120 includes processor subsystem 140, which includes one or more central processing units (CPUs) or data processors. Processor subsystem 140 can include one or more digital signal processors that can be integrated with data processor(s). Processor subsystem 140 can include other processors such as auxiliary processor(s) that may act as a low power consumption, always-on sensor hub for physical sensors. Controller 120 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 132 stores program code 142 for execution by processor subsystem 140 to provide the functionality described herein. Program code 142 includes applications such as communication application 144 that generates incoming call UI 122. Program code 142 may include edge touch application 145 and other applications 146. These applications may be software or firmware that, when executed by controller 120, configures communication device 101 to provide functionality described herein. In one or more embodiments, several of the described aspects of the present disclosure are provided via executable program code of applications executed by controller 120. In one or more embodiments, program code 142 may be integrated into a distinct chipset or hardware module as firmware that operates separately from executable program code. Portions of program code 142 may be incorporated into different hardware components that operate in a distributed or collaborative manner. Memory subsystem 132 further includes operating system (OS), firmware interface, such as basic input/output system (BIOS) or Uniform Extensible Firmware Interface (UEFI), and firmware, which also includes and may thus be considered as program code 142.

Program code 142 may access, use, generate, modify, store, or communicate computer data 150, such as edge touch configuration data 152. Computer data 150 may incorporate "data" that originated as raw, real-world "analog" information that consists of basic facts and figures. Computer data 150 includes different forms of data, such as numerical data, images, coding, notes, and financial data. Computer data 150 may originate at communication device 101 or be retrieved from a remote device via communications subsystem 130. Communication device 101 may store, modify, present, or transmit computer data 150 such as edge touch configuration data 152 that is specific to the flexible display support structure 104 and configuration of touch sensors 107a-107c. Computer data 150 may be organized in one of a number of different data structures. Common examples of computer data 150 include video, graphics, text, and images. Computer data 150 can also be in other forms of flat files, databases, and other data structures.

Data storage subsystem 132 of communication device 101 includes data storage device(s) 158. Controller 120 is communicatively connected, via system interlink 138, to data storage device(s) 158. Data storage subsystem 134 provides program code 142 and computer data 150 stored on non-volatile storage that is accessible by controller 120. For example, data storage subsystem 134 can provide a selection of program code 142 and computer data 150. These applications can be loaded into memory subsystem 132 for execution/processing by controller 120. In one or more embodiments, data storage device(s) 158 can include hard disk drives (HDDs), optical disk drives, and/or solid-state drives (SSDs), etc. Data storage subsystem 134 of communication device 101 can include removable storage device(s) (RSD(s)) 160, which is received in RSD interface 162. Controller 120 is communicatively connected to RSD 160, via system interlink 138 and RSD interface 162. In one or more embodiments, RSD 160 is a non-transitory computer program product or computer readable storage device that may be executed by a processor associated with a user device such as communication device 101. Controller 120 can access data storage device(s) 158 or RSD 160 to provision communication device 101 with program code 142 and computer data 150.

I/O subsystem 136 may include input devices 164 such as microphone 166, image capturing devices 168, and touch input devices 170 (e.g., screens, keys or buttons). I/O subsystem 136 may include output devices 172 such as flexible display 106, audio output devices 174, lights 176, and vibratory or haptic output devices 178.

In one or more embodiments, controller 120, via communications subsystem 130, performs multiple types of cellular over-the-air (OTA) or wireless communication, such as by using a Bluetooth connection or other personal access network (PAN) connection. In an example, user 108 may wear a health monitoring device such as a smartwatch that is communicatively coupled via a wireless connection. In one or more embodiments, communications subsystem 130 includes a global positioning system (GPS) module that receives GPS broadcasts from GPS satellites to obtain geospatial location information. In one or more embodiments, controller 120, via communications subsystem 130, communicates via a wireless local area network (WLAN) link using one or more IEEE 802.11 WLAN protocols with an access point. In one or more embodiments, controller 120, via communications subsystem 130, may communicate via an OTA cellular connection with radio access networks (RANs). In an example, communication device 101, via communications subsystem 130, connects via RANs of a terrestrial network that is communicatively connected to a network server.

Controller 120 may be directly communicatively coupled, or indirectly communicatively coupled via system interlink 138 or a support processor, to one or more physical sensors such as touch sensors 107a-107c. In an example, physical sensors may include orientation sensor 180 configured to detect in which direction is up. Physical sensors may include extension sensor 181 configured to detect a position of flexible display support structure 104 between retracted and extended positions. Physical sensors may include motion sensor 182 configured to detect accelerations of communication device 101.

Controller 120 may include various functionality that enables controller 120 to perform different aspects of artificial intelligence (AI) modules for computation tasks. AI modules may include an artificial neural network, a decision tree, a support vector machine, Hidden Markov model, linear regression, logistic regression, Bayesian networks, and so forth. The AI modules can be individually trained to perform specific tasks, and can be arranged in different sets of AI modules to generate different types of output.

FIG. 3A is a front view of first example communication device 101a having base housing 302 and having flexible display support structure 104 (FIG. 1) implemented as blade assembly 304 that positions flexible display 306 in a retracted position relative to base housing 302. FIG. 3B is a left side view of first example communication device 101a having blade assembly 304 in the retracted position. Display roller 308 is positioned at and aligned with first housing edge 310, which is at the bottom as depicted, of base housing 302 between front side 312 and back side 314 and opposite to distal edge 316 of blade assembly 304. FIG. 3C is a back view of first example communication device 101a having blade assembly 304 in the retracted position. With particular reference to FIGS. 3B-3C, a substantial portion of flexible display 306 is rolled onto back side 314 of communication device 101a.

FIG. 3D is a front view of first example communication device 101a with blade assembly 304 in an extended position. FIG. 3E is a left side view of first example communication device 101a having blade assembly 304 in the extended position. FIG. 3F is a back view of first example communication device 101a having blade assembly 304 in the extended position. With particular reference to FIGS. 3E-3F, blade assembly 304 includes blade substrate 320 that is slidably coupled to base housing 302. Flexible display 306 is attached to blade substrate 320. As described below with regard to FIG. 4, blade substrate 320 has a rigid portion positionable between a retracted position aligned with front side 312 of base housing 302 (FIGS. 3A-3C) and extended position extending beyond second housing edge 322 opposite to first housing edge 310. Blade substrate 320 includes a flexible portion that contacts display roller 308 between the retracted position and the extended position to move a portion of blade assembly 304 between front side 312 and back side 314. Translation mechanism 105 (FIG. 1) may be implemented as an electric motor that operates by rotating display roller 308 (FIGS. 3B and 3E) that is engaged to blade substrate 320 to slide blade assembly 304 relative to base housing 302 between a fully retracted position and a fully extended position. Alternatively, translation mechanism 105 (FIG. 1) may be implemented as an electric motor that operates by sliding blade assembly 304 that is guided by display roller 308 that is passively positioned. The more than one sensor 107a-107b (FIG. 1) may be spaced apart on one or more of translation mechanism 105 (FIG. 1), base housing 302, blade assembly 304, and display roller 308, and configured to detect a force applied to one of more than one edge touch locations.

Figure 4:
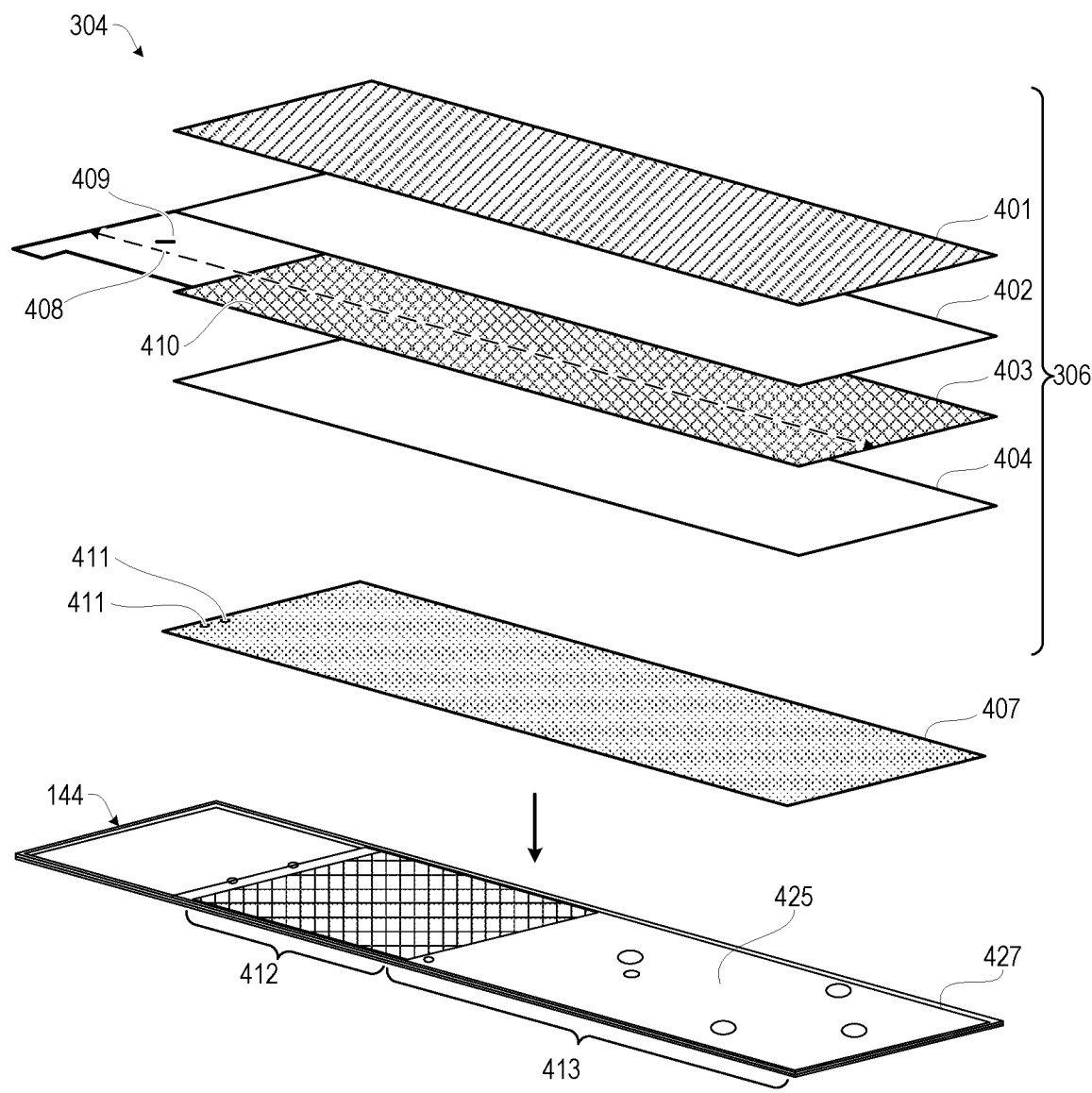
FIG. 4 is a three-dimensional disassembled view of the blade assembly of FIG. 3A, according to one or more embodiments.

FIG. 4 illustrates blade assembly 304 with blade substrate 320 and with flexible display 306 in an exploded view. In one or more embodiments, flexible display 306 includes one or more layers that are coupled or laminated together to complete flexible display 306. In an example, flexible display 306 includes flexible protective layer 401, first adhesive layer 402, flexible display layer 403, second adhesive layer 404 and flexible substrate 407. Beginning from the top of the layer stack opposite to blade substrate 320, in one or more embodiments, flexible protective layer 401 includes an optically transparent substrate such as a thin film sheet of a thermoplastic material. In an example, flexible protective layer 401 is manufactured from a layer of optically transparent polyamide or polycarbonate having a thickness of about eighty microns. Flexible protective layer 401 may function as a fascia by defining a cover or lens for flexible display layer 403. In one or more embodiments, flexible protective layer 401 is optically transparent, in that light can pass through the flexible protective layer 401 so that objects behind flexible protective layer 401 can be distinctly seen. Flexible protective layer 401 may optionally include an ultra-violet barrier. Such a barrier can be useful in improving the visibility of flexible display layer 403.

Beneath flexible protective layer 401 is first adhesive layer 402. In one or more embodiments, first adhesive layer 402 is an optically transparent adhesive. The optically transparent adhesive can be applied to two sides of a thin, optically transparent substrate such that the first adhesive layer 402 functions as an optically transparent layer having optically transparent adhesive on both sides. Where configured as "double-sided tape", first adhesive layer 402 may have a thickness of about fifty microns that can then be spooled and applied between, to couple together, flexible protective layer 401 and flexible display layer 403. In other embodiments, first adhesive layer 402 may be applied between flexible protective layer 401 and the display layer 403 as an optically transparent liquid or gel that is allowed to cure or optionally cured by heat, ultraviolet light, or other techniques. First adhesive layer 402 mechanically couples flexible display layer 403 to flexible protective layer 401.

Flexible display layer 403 includes image producing portion 409 having a same length and width, and aligned with, flexible protective layer 401 and flexible substrate 407. In one or more embodiments, flexible display layer 403 includes T-shaped tongue 410 attached along major axis 408 of flexible display layer 403. Blade substrate 320 is sized to receive flexible display layer 403 attached to T-shaped tongue 410. In one or more embodiments, electronic circuit components configured to operate image producing portion 409 of the flexible display layer 403, connectors, and other components can be coupled to this T-shaped tongue 410 and further coupled to image producing portion 409 of flexible display 306. For instance, as shown in FIG. 4, flexible display layer 403 includes a T-shaped tongue 410 that extends beyond image producing portion 409 of flexible display layer 403 and other layers (401, 402, 404, 405, and 407) of flexible display 306. While T-shaped tongue 410 is T-shaped in this illustrative embodiment, T-shaped tongue 410 can take other shapes.

Flexible display layer 403 optionally may be touch-sensitive. In one or more embodiments, flexible display layer 403 is an organic light emitting diode (OLED) display layer. When coupled to flexible substrate 407, flexible display layer 403 can bend in accordance with various bending radii. For example, some embodiments allow bending radii of between thirty and six hundred millimeters. Other substrates allow bending radii of around five millimeters to provide a display that is foldable through active bending. Other configurations of flexible display 306 may accommodate both bends and folds. In one or more embodiments, flexible display layer 403 may be formed from multiple layers of flexible material such as flexible sheets of polymer or other materials. Flexible display layer 403 may include a layer of optically pellucid electrical conductors, a polarizer layer, one or more optically transparent substrates, and layers of electronic control circuitry such as thin film transistors to actuate pixels and one or more capacitors for energy storage. In one or more embodiments, flexible display layer 403 has a thickness of about 130 microns.

In one or more embodiments, to be touch sensitive, flexible display layer 403 includes a layer including one or more optically transparent electrodes. In one or more embodiments, flexible display layer 403 includes an organic light emitting diode layer configured to present images and other information to user 108 (FIG. 1). The organic light emitting diode layer can include one or more pixel structures arranged in an array, with each pixel structure including a plurality of electroluminescent elements, such as organic light emitting diodes. These various layers can be coupled to one or more optically transparent substrates of flexible display layer 403. In one or more embodiments, flexible substrate 407 includes a thin layer of steel having a thickness of about thirty microns. In one or more embodiments, flexible substrate 407 includes a thin layer of thermoplastic material.

In other embodiments, a layer (401-402) above flexible display layer 403 may be configured with enough stiffness to make the flexible substrate 407 unnecessary. In an example, flexible protective layer 401 is configured with enough stiffness to provide sufficient protection for flexible display 306 during bending, enabling flexible substrate 407 to be omitted.

Flexible display 306 is supported by flexible substrate 407 and by blade substrate 320 having blade substrate 425. In one or more embodiments, blade substrate 425 includes a layer of steel. In one or more embodiments, blade substrate 425 is thicker than flexible substrate 407. In an example, flexible substrate 407 includes a steel layer with a thickness of about thirty microns and blade substrate 425 includes a layer of steel having a thickness of about one hundred microns. In one or more embodiments, blade substrate 425 is a rigid, substantially planar support layer. In an example, blade substrate 425 may be manufactured from stainless steel, from a thin, rigid thermoplastic sheet, or from nitinol material, which is a nickel-titanium alloy.

In one or more embodiments, the flexible substrate 407 is slightly longer along a major axis of the flexible substrate 407 than is the image producing portion 409 of the flexible display 306. Since the T-shaped tongue 410 is T-shaped, this allows one or more apertures 411 to be exposed on either side of the base of the T of the T-shaped tongue 410. This extra length along the major axis provided by the flexible substrate 407 allows one or more fasteners to rigidly couple the first end of the flexible substrate 407 to a tensioner.

Embodiments of the disclosure contemplate that some of the layers comprising the flexible display 306 are stiffer than others. Similarly, other layers of the flexible display 306 are softer than others. For example, where the flexible substrate 407 is manufactured from a metal, one example of which is stainless steel, this layer is stiffer than the first adhesive layer 402. In one or more embodiments, the flexible substrate 407 is the stiffest layer in the flexible display 306, while the first adhesive layer is the softest layers of the flexible display 306. The flexible protective layer 401 and the flexible display layer 403 have a stiffness that falls between that of the flexible substrate 407 and the adhesive layers in one or more embodiments.

In one or more embodiments, blade substrate 425 of blade substrate 320 includes both flexible portion 412 and rigid portion 413. Flexible portion 412 is positioned to encounter bending in translation of blade assembly 304 from the retracted position to the extended position. Rigid portion 413 is positioned to remain on a front side of base housing 102 (FIG. 1) during translation. In the extended position, rigid portion 413 extends beyond the front side of base housing 102 (FIG. 1). In an example, blade substrate 425 is manufactured from a metal such as steel having a thickness of one hundred microns that provides rigidity to rigid portion 413.

In one or more embodiments, blade substrate 320 includes silicone border 427 positioned around a perimeter of blade substrate 425 to protect the edges of flexible display 306 when attached to blade substrate 425 of blade substrate 320. In one or more embodiments, silicone border 427 is co-molded around the perimeter of blade substrate 425.

In one or more embodiments, rigid portion 413 of blade substrate 425 can define one or more apertures. These apertures can be used for a variety of purposes. In an example, some of the apertures can be used to rigidly fasten blade substrate 320 to translation mechanism 105 (FIG. 1), such as a display roller mechanism. Additionally, some of the apertures can contain magnets. Hall-effect sensors positioned in base housing 102 (FIG. 1) to which blade assembly 304 is coupled can then detect the positions of these magnets such that controller 120 (FIG. 1) can determine whether blade assembly 304 including flexible display 306 are in the extended position, the retracted position, the peck position, or an intermediate position.

In one or more embodiments, flexible display 306 is coupled to blade substrate 425 of blade substrate 320 within the confines of silicone border 427. In an example, a first end of flexible display 306 is adhesively coupled to rigid portion 413 of blade substrate 425 of blade substrate 320. The other end of flexible display 306 may be rigidly coupled to a tensioner by passing fasteners through apertures 411 of flexible substrate 407.

Figure 5A:
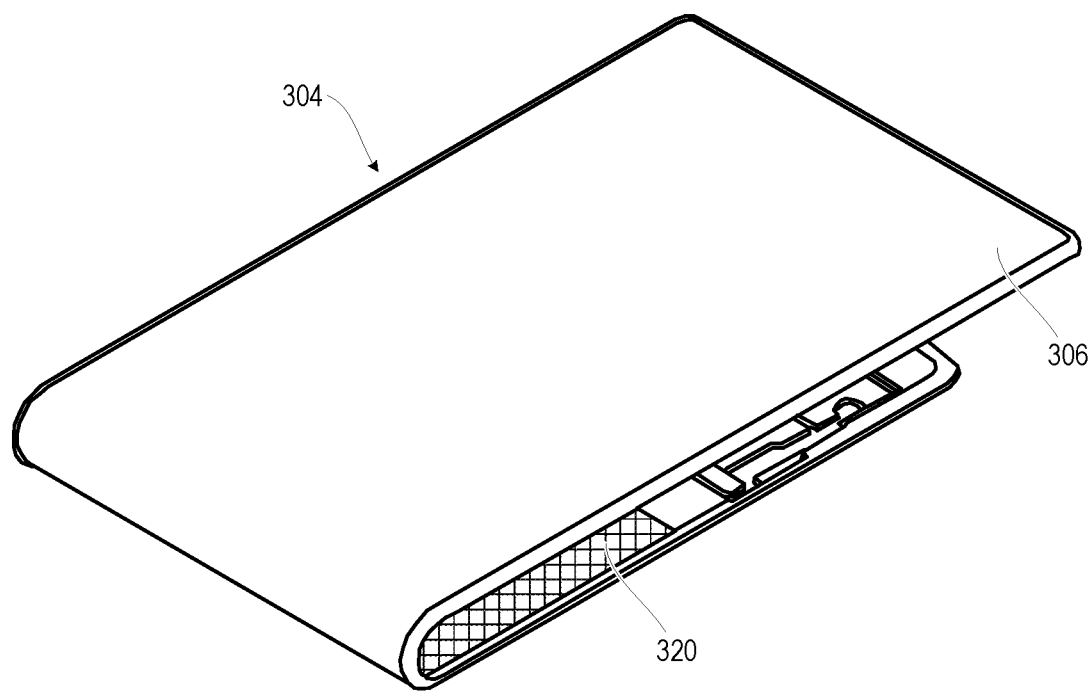
FIG. 5A is a three-dimensional view of the blade assembly of FIG. 4 in a retracted position, according to one or more embodiments.
Figure 5B:
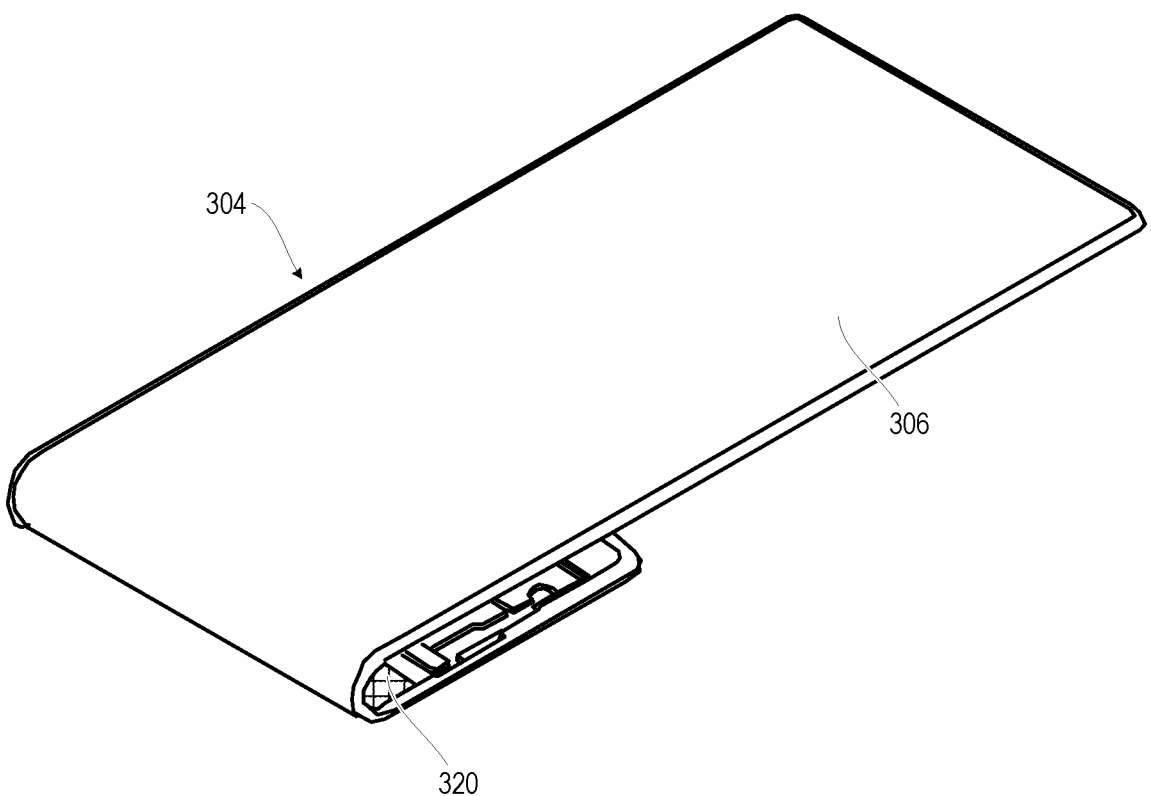
FIG. 5B is a three-dimensional view of the blade assembly of FIG. 5A in an extended position, according to one or more embodiments.

FIG. 5A depicts blade assembly 304 in a fully retracted state. FIG. 5B depicts blade assembly 304 in a fully extended state. In one or more embodiments, flexible display 306 and blade substrate 320 are configured to wrap around a minor surface of base housing 102 (FIG. 1) where a display roller mechanism is situated. In one or more embodiments, a display roller mechanism includes a rotor that is positioned within a curvilinear section of flexible display 306 and blade substrate 320. When placed within base housing 302 (FIG.

3A), operation of translation mechanism 105 (FIG. 1) causes translation of blade assembly 304, which in turn causes rotation of the rotor. The result is a linear translation of the flexible display 306 and blade substrate 320 across a translation surface of base housing 102 (FIG. 1) by drawing flexible display 306 and the blade substrate 320 around the rotor. As previously described, blade substrate 320 (FIG. 4) of blade assembly 304 includes flexible portion 412 (FIG. 4) that allows blade substrate 320 and flexible display 306 to deform around base housing 102 (FIG. 1), corresponding to the respective points of rolling depicted in FIGS. 5A-5B. In scrolling and rolling display embodiments described below, rigid portion 413 of blade substrate 320 (FIG. 4) may be omitted with the entire blade substrate 320 being flexible.

According to one aspect of the present disclosure, touch sensors 107a-107c (FIG. 1) may be incorporated in blade assembly 304 as resistive switches or a force switch array configured to detect forces transferred across the blade assembly 304. Touch sensors 107a-107c (FIG. 1) may detect changes in impedance responsive to compressive forces, shear forces, and torque forces. Touch sensors 107a-107c (FIG. 1) may detect a displacement that corresponds to force. The array of switches may be any of resistance sensing switches, membrane switches, force-sensing switches such as piezoelectric switches, or other equivalent types of technology. In another embodiment, the force sensor can be capacitive. In yet another embodiment, piezoelectric sensors can be configured to sense force as well. For example, where coupled with a cover or lens (e.g., flexible protective layer 401 of FIG. 4) of an extendable display, the piezoelectric sensors can be configured to detect an amount of displacement of the lens to determine force. The piezoelectric sensors can also be configured to determine force of contact against the extendable display of the electronic device.

FIG. 6A is a front view of second example communication device 101b having base housing 602 coupled to flexible display support structure 104 (FIG. 1) that is implemented as telescoping housing 604 that is in a retracted position. Flexible display 606 extends across front side 612 of base housing 602 and telescoping housing 604. FIG. 6B is a left side view of second example communication device 101b having telescoping housing 604 in the retracted position relative to base housing 602. A remaining portion of flexible display 606 scrolls up on scrolling mechanism 608 when telescoping housing 604 is in the retracted position. Flexible display 606 may be an example of a blade assembly 304 (FIG. 4) that is modified to be flexible for scrolling on or into scrolling mechanism 608. FIG. 6C is a back view of second example communication device 101b having telescoping housing 604 in the retracted position. FIG. 6D is a front view of second example communication device 101b with telescoping housing 604 in an extended position. FIG. 6E is a left side view of second example communication device 101b having telescoping housing 604 in the extended position, which retrieves an additional portion of flexible display 606 from scrolling mechanism 608 to cover extension portion 609 of telescoping housing 604. FIG. 6F is a back view of second example communication device 101b having the telescoping housing in the extended position. Translation mechanism 105 (FIG. 1) may be implemented as an electric motor that operates by extending and retracting telescoping housing 604 relative to base housing 602. Scrolling mechanism may be spring loaded to reel in a remaining portion of flexible display 606 during retraction and to release the remaining portion of flexible display 606 during extension. The more than one sensor 107a-107b (FIG. 1) may be spaced apart on one or more of translation mechanism 105 (FIG. 1), base housing 602, flexible display 606, and scrolling mechanism 608, and configured to detect a force applied to one of the more than one edge touch locations.

FIG. 7A is a front view of third example communication device 101c having base housing 702 coupled to flexible display support structure 104 (FIG. 1) that is implemented as telescoping housing 704 that is in a retracted position. Flexible display 606 extends across front side 712 of base housing 702 and telescoping housing 704. FIG. 7B is a left side view of third example communication device 101c having telescoping housing 704 in the retracted position. Display roller 708 is positioned at and aligned with first housing edge 710, which is at the bottom as depicted, of base housing 702 between front side 712 and back side 714 and opposite to distal edge 716 of telescoping housing 704. Flexible display 706 contacts display roller 708 between the retracted position and the extended position to move a portion of flexible display 706 between front side 712 and back side 714. FIG. 7C is a back view of third example communication device 101c having telescoping housing 704 in the retracted position. FIG. 7D is a front view of third example communication device 101c with telescoping housing 704 in an extended position. FIG. 7E is a left side view of third example communication device 101c having telescoping housing 704 in the extended position. FIG. 7F is a back view of third example communication device 101c having the telescoping housing in the extended position. Translation mechanism 105 (FIG. 1) may be implemented as an electric motor that operates by rotating display roller 708 (FIGS. 7B and 7E) that is engaged to flexible display 706 to translate flexible display 706 relative to base housing 702 between a fully retracted position and a fully extended position. Alternatively, translation mechanism 105 (FIG. 1) may be implemented as an electric motor that operates to move flexible display 706. Flexible display 706 is guided by display roller 708 that is passively positioned. The more than one sensor 107a-107b (FIG. 1) may be spaced apart on one or more of translation mechanism 105 (FIG. 1), base housing 702, flexible display 706, and display roller 708, and configured to detect a force applied to one of the more than one edge touch locations.

Figure 8:
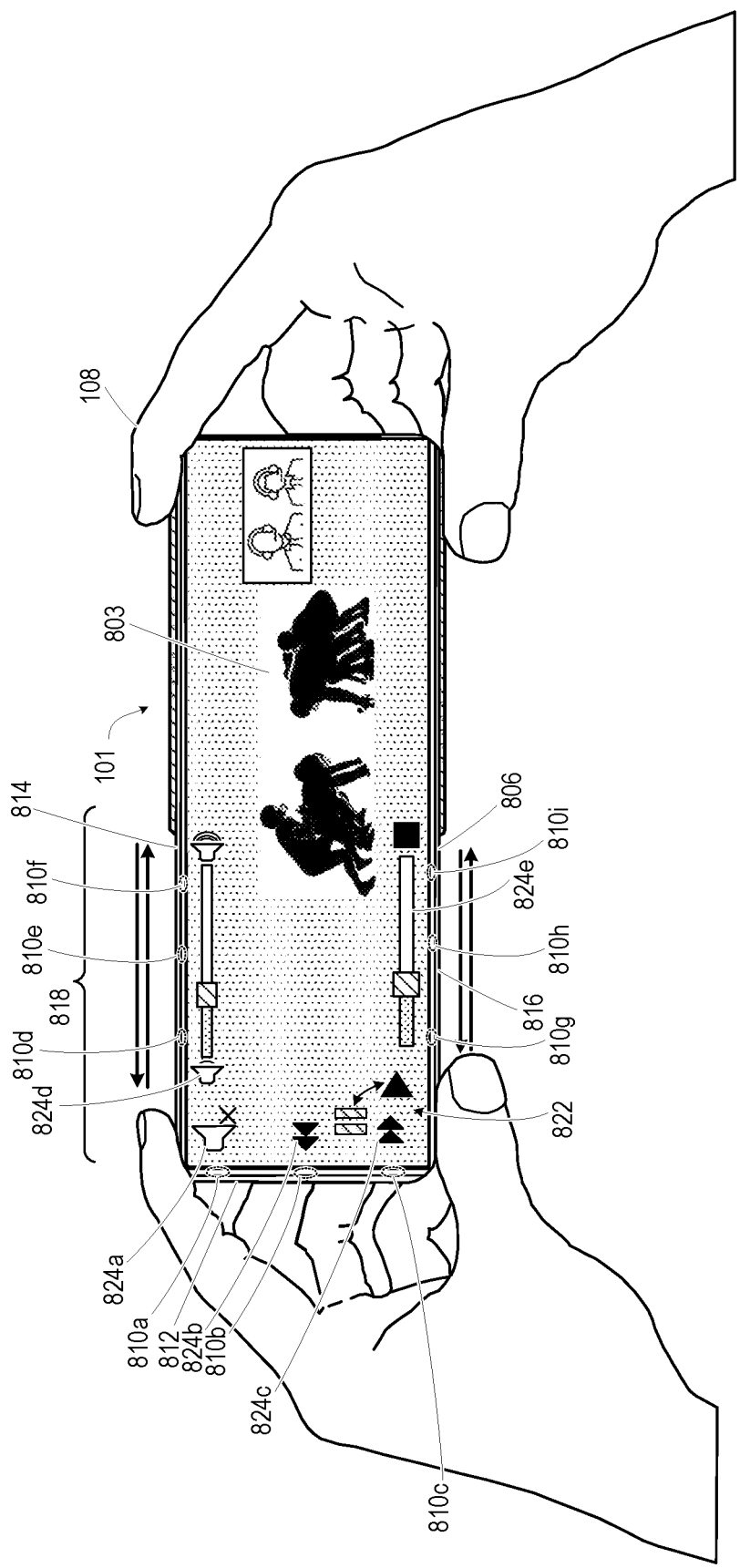
FIG. 8 is a front view of the communication device of FIG. 1 being held horizontally to view audiovisual content being controlled in part by edge touch inputs to a partially extended display, according to one or more embodiments.

FIG. 8 is a front view of the communication device 101 of FIG. 1 being held horizontally by user 108 to view audiovisual content 803 being controlled in part by edge touch inputs to extendable display 806 that is partially extended. Extendable display 806 is extended leftward to expose extended portion 818, which enables controller to logically segment left distal edge 812 into top, middle and bottom touch locations 810a, 810b and 810c. Top orthogonal edge 814 is segmented into left, center, and right touch locations 810d, 810e, and 810f. Bottom orthogonal edge 816 is segmented into left, center, and right touch locations 810g, 810h, and 810i. Edge control functionality provided by touch locations 810a-810i enables user 108 to modify playback or streaming of audiovisual content 803 without blocking viewing of visual components of the audiovisual content 803. In an example, communication device 101 presents a function, depicted as audiovisual UI 822, on flexible display 106 of communication device 101. Audiovisual UI 822 has at least one interactive feature that can be manually modified by a user input. In the illustrated example, mute interactive feature 824a is presented proximate to touch location 810a on a left side of distal edge 112. Rewind feature 824b is presented proximate to touch location 810b. Fast forward interactive feature 824c is presented at touch location 810c.

Volume slider feature 824*d* is presented proximate to touch locations 810*d*-810*f* to detect a sliding right input for increasing volume or a sliding left input for decreasing volume. Time slider feature 824*e* is presented proximate to touch locations 810*g*-810*i* to detecting a sliding right input for playing a later portion of the audiovisual content 803 or a sliding left input for rewinding to an earlier portion of the audiovisual content 803.

Figure 9:
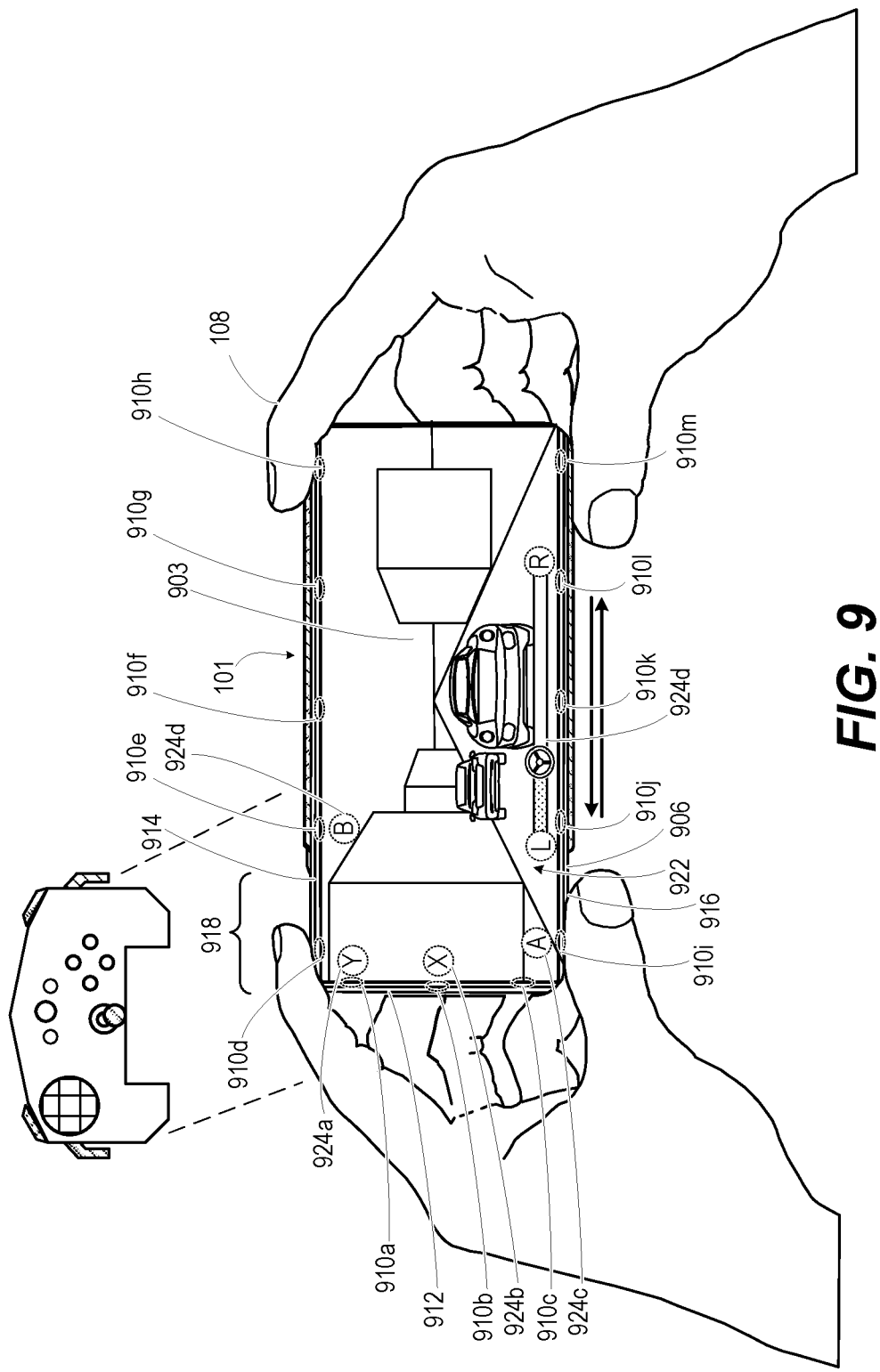
FIG. 9 is a front view of the communication device of FIG. 1 being held horizontally to play a video game while being controlled in part by edge touch inputs to a partially extended display, according to one or more embodiments.

FIG. 9 is a front view of the communication device 101 of FIG. 1 being held horizontally by user 108 to view gaming audiovisual content 903 being controlled in part by edge touch inputs to extendable display 906 that is partially extended. Extending display 906 is extended leftward to expose extended portion 918, which enables controller to segment left distal edge 912 into top, middle and bottom touch locations 910*a*, 910*b* and 910*c*. Top orthogonal edge 914 is segmented into left most touch location 910*d* that is exposed. In one or more embodiments addition touch locations may be accessible for force inputs even if the locations are not extended beyond base housing 102. In an example, additional top touch locations moving rightward from touch location 910*d* may include top touch locations 910*e*, 910*f*, 910*g* and 910*h*. In one or more embodiments, communication device 101 may automatically translate to expose additional touch locations when required for particular touch inputs. Bottom orthogonal edge 916 is similarly segmented into at least most left touch location 910*i* and optionally further segmented into bottom touch locations 910*j*, 910*k*, 910*l* and 910*m*. Edge control functionality provided by touch locations 910*a*-910*i* enables user 108 to provide game command inputs to gaming audiovisual content 903 without blocking viewing of visual components of gaming audiovisual content 903. In an example, communication device 101 presents game controller button function, depicted as game controller UI 922, on flexible display 106 of communication device 101. Game controller UI 922 has at least one interactive feature that can be manually modified by a user input. In an example, Y button feature 924*a* is presented proximate to both touch locations 910*a* and 910*d*, which can both be used. X touch button feature 924*b* is presented proximate to touch location 910*b*. A button feature 924*c* is proximate to both touch locations 910*c* and 910*i*. B button feature 924*d* is presented proximate to touch location 910*e*. Steering wheel slider feature 924*d* is presented proximate to touch locations 910*j*-910L.

Figure 10:
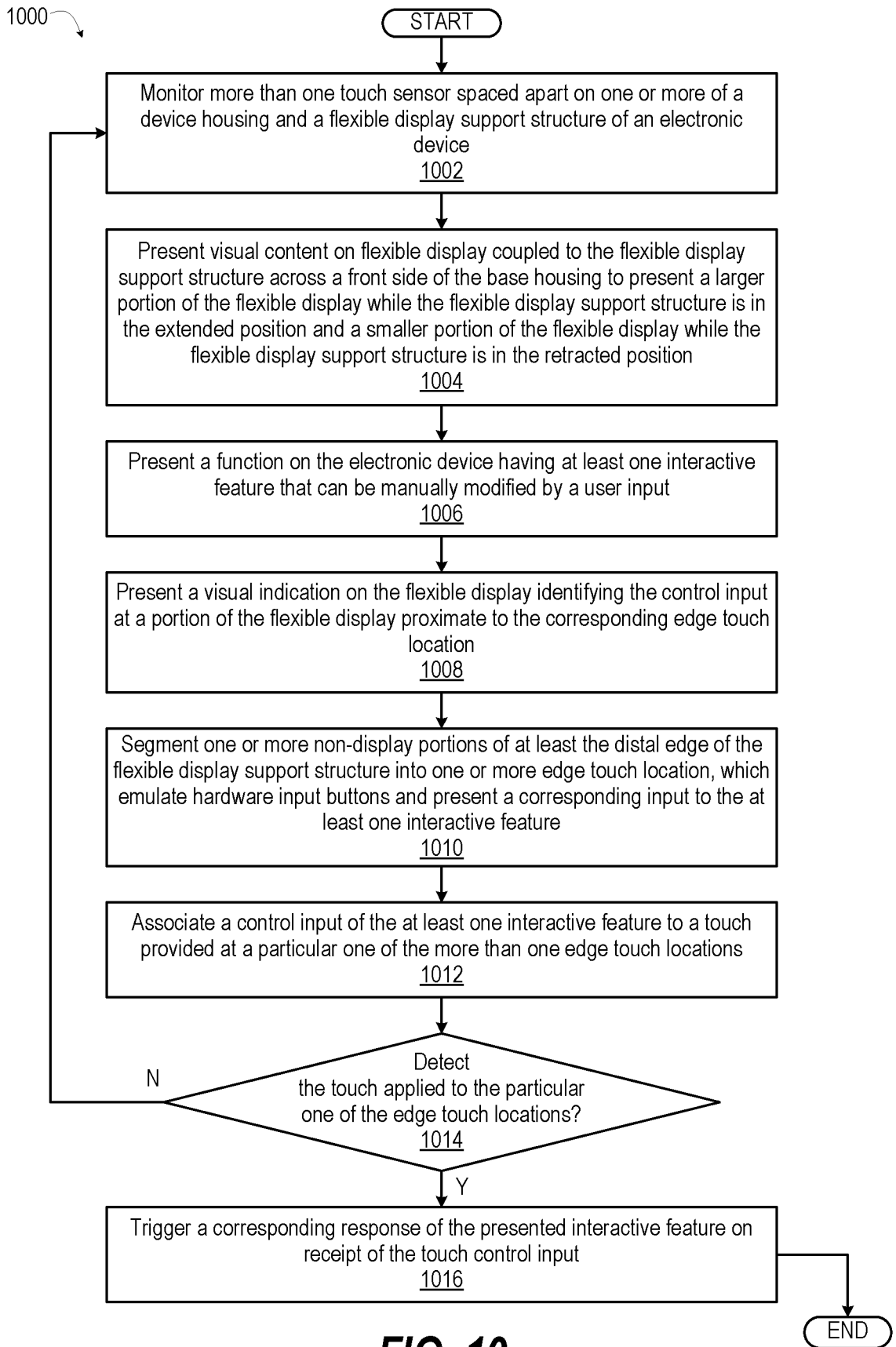
FIG. 10 is a flow diagram presenting a method of providing edge touch control functionality by monitoring for a force on an extendable portion of a scrollable or rollable display device, according to one or more embodiments.

FIG. 10 is a flow diagram presenting a method of providing edge touch control functionality by monitoring for a force on an extendable portion of a scrollable or rollable display device. The description of method 1000 is provided with general reference to the specific components illustrated within the preceding FIGS. 1, 2A-2B, 3A-3F, 4, 5A-5B, 6A-6F, 7A-7F, 8, and 9. Specific components referenced in method 1000 (FIG. 10) may be identical or similar to components of the same name used in describing preceding FIGS. 1, 2A-2B, 3A-3F, 4, 5A-5B, 6A-6F, 7A-7F, 8, and 9. In one or more embodiments, controller 120 (FIG. 1) configures communication device 101 (FIG. 1), communication device 101*a* (FIG. 3A), communication device 101*b* (FIG. 6A), communication device 101*c* (FIG. 7A), or a similar computing device to provide the described functionality of method 1000 (FIG. 10).

With reference to FIG. 10, in one or more embodiments, method 1000 includes monitoring more than one touch sensors spaced apart on one or more of a base housing and a flexible display support structure of an electronic device (block 1002). The flexible display support structure is moveably attached to and positionable on the base housing between a retracted position and an extended position relative to the base housing. The more than one touch sensors are configured to detect a force applied to an edge touch location of more than one edge touch locations along a distal edge and two orthogonal longitudinal edges of an extended portion of the flexible display support structure. Method 1000 includes presenting visual content on flexible display coupled to the flexible display support structure across a front side of the base housing to present a larger portion of the flexible display while the flexible display support structure is in the extended position and a smaller portion of the flexible display while the flexible display support structure is in the retracted position (block 1004). Method 1000 includes presenting a function on the electronic device having at least one interactive feature that can be manually modified by a user input (block 1006). Method 1000 includes presenting a visual indication on the flexible display identifying the control input at a portion of the flexible display proximate to the corresponding edge touch location (block 1008). Method 1000 includes segmenting one or more non-display portions of at least the distal edge of the flexible display support structure into one or more edge touch location, which emulate hardware input buttons and present a corresponding input to the at least one interactive feature (block 1010). Method 1000 includes associating a control input of the at least one interactive feature to a touch provided at a particular one of the more than one edge touch locations (block 1012). Method 1000 includes determining whether the touch is detected being applied to the particular one of the edge touch locations (decision block 1014). In response to determining that the control input is not detected being applied to the particular one of the edge touch locations, method 1000 returns to block 1002. In response to determining that the control input is detected being applied to the particular one of the edge touch locations, method 1000 includes triggering a corresponding response of the presented interactive feature on receipt of the touch control input (block 1016). Then method 1000 ends.

In one or more embodiments, method 1000 may further include detecting a tap applied to the particular one of the edge touch locations as the control input. Method 1000 may further include triggering the corresponding response comprising a tap or press input of the presented function to receipt of the control input. The tap is at a single point and does not slide across the edge. The tap emulates a button press as a binary input rather than a slider control movement than can convey one of more than one values depending on the lateral length of the touch.

In one or more embodiments, method 1000 may further include detecting a sliding touch applied to the particular one of the edge touch locations as the control input. Method 1000 may further include triggering the corresponding response comprising an adjustable value within a control range of values of the presented function to receipt of the control input.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a base housing having a front side and a back side;
   a flexible display support structure having an extended portion with a distal edge extending between ends of two orthogonal longitudinal edges and moveably attached to and positionable on the base housing between a retracted position and an extended position relative to the base housing;
   a flexible display coupled to the flexible display support structure across a front side of the base housing to present a larger portion of the flexible display while the flexible display support structure is in the extended position and a smaller portion of the flexible display while the flexible display support structure is in the retracted position;
   more than one touch sensors spaced apart on one or more of the base housing and the flexible display support structure and configured to detect a force applied to one edge touch location among a plurality of more than one edge touch locations defined along the distal edge and the two orthogonal longitudinal edges of the extended portion of the flexible display support structure, while the base housing is being held; and
   a controller communicatively connected to the flexible display and the more than one touch sensor, and which:
      presents a function on the electronic device having at least one interactive feature manually modified by a user input;
      segments one or more non-display portions of at least the distal edge of the flexible display support structure into one or more edge touch location, which emulate hardware input buttons and present a corresponding input to the at least one interactive feature;
      associates a control input of the at least one interactive feature to a touch provided at a particular one of the more than one edge touch locations, the touch detectable by the more than one touch sensor;
      detects the touch applied to the particular one of the edge touch locations; and
      triggers a corresponding response of the presented interactive feature on receipt of the touch control input.

2. The electronic device of claim 1, further comprising a position sensor communicatively coupled to the controller and configured to detect a position of the flexible display support structure relative to the base housing, and wherein the controller:
   in response to detecting a touch to an edge of the flexible display support structure, identifies the more than one edge touch locations on the flexible display support structure based on the position sensor.

3. The electronic device of claim 1, wherein the controller presents a visual indication on the flexible display identifying the control input at a portion of the flexible display proximate to the corresponding edge touch location.

4. The electronic device of claim 1, wherein the touch comprises a tap and the control input associated with the tap comprises a binary input.

5. The electronic device of claim 1, wherein the touch comprises a sliding touch along an edge of the extended portion and the control input associated with the touch comprises an adjustable value within a control range of values.

6. The electronic device of claim 1, further comprising:
   a display roller positioned at and aligned with a first housing edge of the base housing between the front side and the back side and opposite to the distal edge of the flexible display support structure that comprises a blade assembly having a blade slidably coupled to the base housing and having the flexible display attached to the blade, the blade having a rigid portion positionable between a retracted position aligned with the front side of the base housing and extended position extending beyond a second housing edge opposite to the first housing edge, the blade comprising a flexible portion that contacts the display roller between the retracted position and the extended position to move a portion of the blade assembly between the front side and the back side;

a translation mechanism operable to slide the blade assembly relative to the base housing between a fully retracted position and a fully extended position; and the more than one sensor spaced apart on one or more of the base housing, the display roller, the blade assembly, and the translation mechanism, and configured to detect a force applied to the one of more than one edge touch locations.

7. The electronic device of claim 1, wherein:

the flexible display support structure comprises a telescoping housing having an extension portion slidingly received into a first housing edge of the base housing; and the electronic device further comprises a scrolling mechanism incorporated inside the base housing proximate to a second housing edge opposite to the first housing edge, the scrolling mechanism configured to receive a remaining portion of the flexible display while the telescoping housing is in the retracted position.

8. The electronic device of claim 1, further comprising:

a display roller positioned at and aligned with a first housing edge of the base housing between the front side and the back side and opposite to the distal edge of the flexible display support structure that comprises a telescoping housing having an extension portion slidingly received into a first housing edge of the base housing;

the flexible display is coupled at the distal edge to the telescoping housing and rolls around a second housing edge of the base housing opposite to the first housing edge, positioning a remaining portion onto a back side of the base housing while the telescoping housing is in the retracted position; and the more than one sensor are spaced apart on one or more of the base housing and the telescoping housing, and the display roller and configured to detect a force applied to the one of more than one edge touch locations.

9. The electronic device of claim 1, wherein the more than one sensor is an array of switches selected from a group comprising: (i) resistive switches; (ii) force sensing piezoelectric switches; and (iii) force sensing capacitive switches.

10. The electronic device of claim 1, further comprising an audio output device communicatively coupled to the controller, and wherein the controller:

presents one or more of visual content at the flexible display and audio content at the audio output device; and changes presentation of the one or more of the visual content and the audio content in response to the control input.

11. A method comprising:

monitoring more than one touch sensors spaced apart on one or more of a base housing and a flexible display support structure of an electronic device, the flexible display support structure moveably attached to and positionable on a base housing between a retracted position and an extended position relative to the base housing, the more than one touch sensors configured to detect a force applied to one edge touch location among a plurality of edge touch locations defined along a distal edge extending between ends of two orthogonal longitudinal edges of an extended portion of the flexible display support structure, while the base housing is being held;

presenting visual content on flexible display coupled to the flexible display support structure across a front side of the base housing to present a larger portion of the flexible display while the flexible display support structure is in the extended position and a smaller portion of the flexible display while the flexible display support structure is in the retracted position;

presenting a function on the electronic device having at least one interactive feature manually modified by a user input;

segmenting one or more non-display portions of at least the distal edge of the flexible display support structure into one or more edge touch location, which emulate hardware input buttons and present a corresponding input to the at least one interactive feature;

associating a control input of the at least one interactive feature to a touch provided at a particular one of the more than one edge touch locations, the touch detectable by the more than one touch sensor;

detecting the touch applied to the particular one of the edge touch locations; and triggering a corresponding response of the presented interactive feature on receipt of the touch control input.

12. The method of claim 11, further comprising, in response to detecting a touch to an edge of the flexible display support structure, identifying the more than one edge touch locations on the flexible display support structure based on a position sensor configured to detect a position of the flexible display support structure relative to the base housing.

13. The method of claim 11, further comprising presenting a visual indication on the flexible display identifying the control input at a portion of the flexible display proximate to the corresponding edge touch location.

14. The method of claim 11, further comprising:

detecting the control input comprising a tap applied to the particular one of the edge touch locations; and triggering the corresponding response comprising a binary input of the presented function to receipt of the control input.

15. The method of claim 11, further comprising:

detecting the control input comprising a sliding touch applied to the particular one of the edge touch locations; and triggering the corresponding response comprising an adjustable value within a control range of values of the presented function to receipt of the control input.

16. The method of claim 11, wherein the flexible display support structure comprises a blade assembly, and the method further comprises:

triggering a translation mechanism operable to slide the blade assembly relative to the base housing between a fully retracted position and a fully extended position, the blade assembly having a blade slidably coupled to the base housing and having the flexible display attached to the blade, the blade having a rigid portion positionable between a retracted position aligned with the front side of the base housing and extended position extending beyond a second housing edge opposite to a first housing edge, the blade comprising a flexible portion that contacts a display roller between the retracted position and the extended position to move a portion of the blade assembly between the front side and a back side, the display roller positioned at and aligned with a first housing edge of the base housing between the front side and the back side and opposite to the distal edge of the flexible display support structure that comprises a blade assembly; and monitoring the more than one sensor spaced apart on one or more of the base housing, the display roller, the blade assembly, and the translation mechanism, and configured to detect a force applied to the one of more than one edge touch locations.

17. The method of claim 11, wherein the flexible display support structure comprises a telescoping housing having an extension portion slidingly received into a first housing edge of the base housing, and wherein the method further comprises receiving a remaining portion of the flexible display in a scrolling mechanism while retracting the telescoping housing, the scrolling mechanism incorporated inside the base housing proximate to a second housing edge opposite to the first housing edge, the scrolling mechanism configured to receive the remaining portion of the flexible display.

18. The method of claim 11, wherein the flexible display support structure comprises a telescoping housing having an extension portion slidingly received into a first housing edge of the base housing, and wherein the method further comprises:
   rolling the flexible display around a display roller at a second housing edge of the base housing opposite to the first housing edge, positioning a remaining portion onto a back side of the base housing while the telescoping housing is in the retracted position; and
   monitoring the more than one sensor that are spaced apart on one or more of the base housing and the telescoping housing, and the display roller and configured to detect a force applied to the one of more than one edge touch locations.

19. The method of claim 11, further comprising an audio output device communicatively coupled to the controller, and wherein the controller:
   presenting one or more of visual content at the flexible display and audio content at an audio output device; and
   changing presentation of the one or more of the visual content and the audio content in response to the control input.

20. A computer program product comprising:
a computer readable storage device; and
program code on the computer readable storage device that when executed by a processor associated with an electronic device, the program code enables the electronic device to provide functionality of:
monitoring more than one touch sensors spaced apart on one or more of a base housing and a flexible display support structure of an electronic device, the flexible display support structure moveably attached to and positionable on a base housing between a retracted position and an extended position relative to the base housing, the more than one touch sensors configured to detect a force applied to one edge touch location among a plurality of edge touch locations defined along a distal edge and two orthogonal longitudinal edges of an extended portion of the flexible display support structure, while the base housing is being held;
presenting visual content on flexible display coupled to the flexible display support structure across a front side of the base housing to present a larger portion of the flexible display while the flexible display support structure is in the extended position and a smaller portion of the flexible display while the flexible display support structure is in the retracted position;
presenting a function on the electronic device having at least one interactive feature manually modified by a user input;
segmenting one or more non-display portions of at least the distal edge of the flexible display support structure into one or more edge touch location, which emulate hardware input buttons and present a corresponding input to the at least one interactive feature;
associating a control input of the at least one interactive feature to a touch provided at a particular one of the more than one edge touch locations, the touch detectable by the more than one touch sensor;
detecting the touch applied to the particular one of the edge touch locations; and
triggering a corresponding response of the presented interactive feature on receipt of the touch control input.

* * * * *